US009984845B2

(12) United States Patent
Clay et al.

(10) Patent No.: US 9,984,845 B2
(45) Date of Patent: May 29, 2018

(54) CIRCUIT BREAKER WITH INTERFERENCE FIT SOCKET

(71) Applicant: SAFRAN ELECTRICAL & POWER, Blagnac (FR)

(72) Inventors: Justin M. Clay, Bradenton, FL (US); James Michael McCormick, Bradenton, FL (US); Peter Nerstrom, Sarasota, FL (US)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days. days.

(21) Appl. No.: 15/591,342

(22) Filed: May 10, 2017

(65) Prior Publication Data
US 2017/0330717 A1   Nov. 16, 2017

Related U.S. Application Data

(60) Provisional application No. 62/334,632, filed on May 11, 2016.

(51) Int. Cl.
*H01H 71/08* (2006.01)
*H01H 73/08* (2006.01)
(Continued)

(52) U.S. Cl.
CPC ............ *H01H 71/08* (2013.01); *H01H 69/00* (2013.01); *H01H 71/12* (2013.01); *H01R 13/10* (2013.01);
(Continued)

(58) Field of Classification Search
CPC ........ H01H 71/08; H01H 73/08; H01H 73/20; H01H 2207/022
(Continued)

(56) References Cited

U.S. PATENT DOCUMENTS

| 3,358,099 A | 12/1967 | De Bellomayre |
| 4,329,669 A * | 5/1982 | Krasser ................. H01H 83/12 335/20 |

(Continued)

FOREIGN PATENT DOCUMENTS

| EP | 1507275 | 2/2005 |
| EP | 1837891 A2 | 9/2007 |

(Continued)

OTHER PUBLICATIONS

International Search Report and Written Opinion dated Jul. 21, 2017, 14 pages.

(Continued)

*Primary Examiner* — Gary Paumen
(74) *Attorney, Agent, or Firm* — Rankin, Hill & Clark LLP (57) ABSTRACT

A circuit breaker includes a housing, separable contacts, a trip mechanism, a first terminal, a second terminal, a first press fit connector, a second press fit connector, a first socket, and a second socket. The first terminal is electrically connected with a first contact of the separable contacts and includes a first base section disposed outwardly from the housing. The second terminal is electrically connected with a second contact and includes a second base section disposed outwardly from the housing. The first press fit connector is attached to the first base section via a first press fit. The second press fit connector is attached to the second base section via a second press fit. The first socket is attached to the first press fit connector. The second socket is attached to the second press fit connector.

19 Claims, 5 Drawing Sheets

(51) Int. Cl.
*H01H 69/00* (2006.01)
*H01H 71/12* (2006.01)
*H01R 13/10* (2006.01)
*H01R 13/422* (2006.01)
*H01R 25/16* (2006.01)
*H01R 43/20* (2006.01)
*H01H 1/58* (2006.01)
*H02B 1/056* (2006.01)

(52) U.S. Cl.
CPC ......... *H01R 13/422* (2013.01); *H01R 25/162* (2013.01); *H01R 43/20* (2013.01); *H01H 1/5866* (2013.01); *H01H 2071/086* (2013.01); *H02B 1/056* (2013.01)

(58) Field of Classification Search
USPC ..................................... 335/6, 196–198, 202
See application file for complete search history.

(56) References Cited

U.S. PATENT DOCUMENTS

| | | | |
|---|---|---|---|
| 4,387,945 A | 6/1983 | MacAvoy | |
| 4,612,528 A | 9/1986 | Peter | |
| 5,378,552 A | 1/1995 | Dixon, Jr. | |
| 5,981,893 A | 11/1999 | Bleikel et al. | |
| 6,274,833 B1 * | 8/2001 | Moody | H01H 71/0228 200/401 |
| 6,315,580 B1 * | 11/2001 | Hurtubise | H01H 73/08 361/627 |
| 6,864,446 B1 | 3/2005 | Mills | |
| 7,021,957 B2 | 4/2006 | Sweetland et al. | |
| 7,570,146 B2 | 8/2009 | Mills et al. | |
| 8,094,436 B2 | 1/2012 | Mills et al. | |
| 9,720,044 B2 * | 8/2017 | Mills | G01R 31/327 |
| 2006/0061439 A1 * | 3/2006 | Schalk | H01H 73/08 335/6 |
| 2010/0068941 A1 | 3/2010 | Yang et al. | |
| 2011/0028051 A1 | 2/2011 | Heigl et al. | |
| 2011/0235244 A1 | 9/2011 | Mills et al. | |
| 2013/0273788 A1 | 10/2013 | Fujita et al. | |
| 2015/0079854 A1 | 3/2015 | Mills et al. | |
| 2015/0153414 A1 * | 6/2015 | Mills | H01H 71/04 324/424 |

FOREIGN PATENT DOCUMENTS

| | | |
|---|---|---|
| JP | 2002-237248 | 8/2002 |
| WO | 2013/151740 A1 | 10/2013 |
| WO | 2015/084711 A1 | 6/2015 |

OTHER PUBLICATIONS

U.S. Appl. No. 15/488,889, filed Apr. 17, 2017, 14 pages.
U.S. Office Action dated Nov. 16, 2017 from corresponding U.S. Appl. No. 15/488,889, 22 pages.
International Search Report and Written Opinion from Corresponding International Application PCT/US17/27880, dated Oct. 20, 2017, 18 pages.

* cited by examiner

CIRCUIT BREAKER WITH INTERFERENCE FIT SOCKET

BACKGROUND

Circuit breakers used in aircraft electrical systems provide overcurrent protection, and also may serve as switches for turning equipment on and off. In such a circuit breaker, a push-pull handle on the circuit breaker is moved from an inward position outward to open a corresponding load circuit. This action may either be manual or automatic in the event of an overload or fault condition. When the push-pull handle is moved from the outward position inwardly, the load circuit is reenergized. Alternatively, the open and closed action of a known circuit breaker can also be actuated via a toggle.

Figure 1:
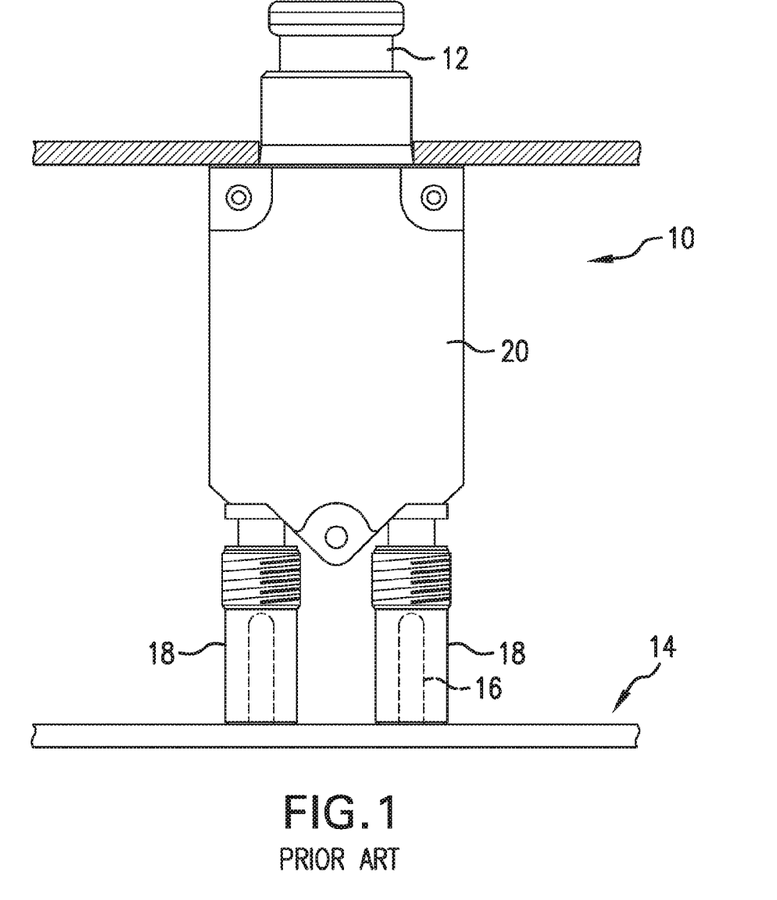
FIG. 1 is a schematic side view of a known plug-in circuit breaker.

With reference to FIG. 1, one type of circuit breaker used in aircraft electrical systems is a plug-in circuit breaker 10. The plug-in circuit breaker 10 includes a push-pull handle 12 similar to what was described above. The aircraft electrical system includes a bus structure 14 on which a plurality of pins 16 (only two are shown in FIG. 1) are provided. The known plug-in circuit breaker 10 can be used for one phase and three phase devices. The known plug-in circuit breaker 10 includes two sockets 18, and each socket 18 receives a respective pin 16 disposed on the bus structure 14. One of the sockets acts as a line terminal (or power input) for the plug-in circuit breaker 10 and the other socket operates as a load terminal (or power output). These are interchangeable at the circuit breaker level and are typically dictated by the bus work and wiring layout. In this known plug-in circuit breaker 10, each of the sockets 18 is brazed or welded onto a respective terminal (not visible) located in a housing 20 of the plug-in circuit breaker 10. Although this form of connection works adequately, brazing the socket to the respective terminal requires multiple processes and steps, which can be costly or cumbersome.

SUMMARY

In view of the foregoing, a circuit breaker is provided that includes a housing, separable contacts, a trip mechanism, a first terminal, a second terminal, a first press fit connector, a second press fit connector, a first socket, and a second socket. The separable contacts are received in the housing and include a first contact and a second contact. At least one of the contacts is moveable with respect to the other to open and close the separable contacts. The trip mechanism is operatively connected with at least one of the first and second contacts to selectively open the separable contacts. The first terminal is electrically connected with the first contact and includes a first base section disposed outwardly from the housing. The second terminal is electrically connected with the second contact and includes a second base section disposed outwardly from the housing. The first press fit connector is attached to and electrically connected with the first base section via a first press fit. The second press fit connector is attached to and electrically connected with the second base section via a second press fit. The first socket is attached to and electrically connected with the first press fit connector. The first socket includes a first pin receiving passage configured to receive a pin located on an associated bus structure. The second socket is attached to and electrically connected with the second press fit connector. The second socket includes a second pin receiving passage configured to receive another pin located on the associated bus structure.

A method of assembling a circuit breaker includes placing separable contacts in a housing, connecting a first terminal with a first contact of the separable contacts, and connecting a second terminal with a second contact of the separable contacts. The method also includes press fitting a first press fit connector with a portion of the first terminal extending from the housing, and press fitting a second press fit connector with a portion of the second terminal extending form the housing. The method of assembling the circuit breaker also includes attaching a first socket to the first press fit connector and attaching a second socket to the second press fit connector. The first socket includes a first pin receiving passage configured to receive a pin located on an associated bus structure. The second socket includes a second pin receiving passage configured to receive another pin located on the associated bus structure.

DETAILED DESCRIPTION

Figure 2:
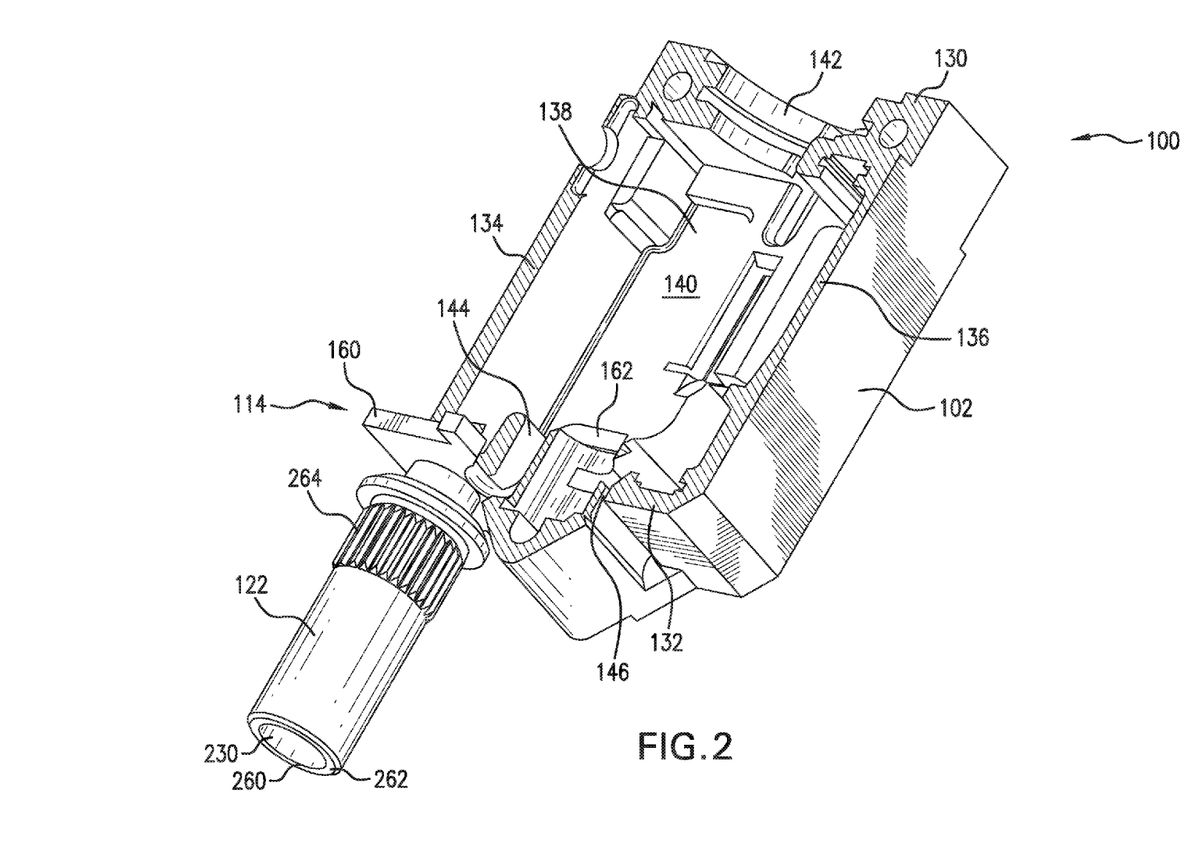
FIG. 2 is a schematic cross-sectional view of a circuit breaker with an interference fit socket.

FIG. 2 depicts components of a circuit breaker 100 with a press fit (interference fit) socket. The circuit breaker 100 includes a housing 102 and separable contacts 104 (schematically depicted in FIG. 3) received in the housing. In the illustrated embodiment, the separable contacts include a first contact 106, which is fixed in the housing 102, and a second contact 108, which is moveable. As such, at least one of the first contact 106 and the second contact 108 is moveable with respect to the other, and in this instance, the second contact 108 is moveable with respect to the first contact 106, to open and close the separable contacts 104.

The circuit breaker 100 also includes a trip mechanism 112 (depicted schematically in FIG. 3) operatively connected with at least one of the first and second contacts 106, 108 to selectively open the separable contacts 104. A first terminal 114 is electrically connected with the first contact 106, and a second terminal 116 (FIGS. 4 and 5) is connected with the second contact 108. A first press fit connector 118 is attached to and electrically connected with the first terminal 114 via a first press fit, i.e. an interference fit. Similarly, and with reference to FIGS. 4 and 5, a second press fit connector 118a, which can be identical in configuration to the first press fit connector, is attached to and electrically connected with the second terminal 116 via a second press fit (see FIG. 5). With reference back to FIGS. 2 and 3, a first socket 122 attaches to and electrically connects with the first press fit connector 118. Similarly, and with reference to FIGS. 4 and 5, a second socket 122a, which can be identical in configuration to the first socket, attaches to and electrically connects with the second press fit connector 118a.

The housing 102 is made from an electrically insulative material. The housing 102 includes an upper wall 130 and a lower wall 132. The housing 102 also includes a plurality of sidewalls such as a left side wall 134, a right side wall 136, a rear wall 138, and a forward wall, which is not visible in FIGS. 2 and 3. The upper wall 130, the lower wall 132, and the plurality of sidewalls 134, 136, 138 define a cavity 140. The upper wall 130 also includes an actuator opening 142 that leads to the cavity 140. The lower wall 132 includes a first terminal slot 144, which receives the first terminal 114, and a second terminal slot 146 that receives the second terminal 116 (shown in FIGS. 4 and 5).

The trip mechanism 112 is operatively connected with at least one of the first and second contacts 106, 108, and in the depicted embodiment is operatively connected with the second contact 108. The trip mechanism 112 selectively opens separable contacts 104 in the event of an overload or fault condition. The trip mechanism 112 can include a bimetal strip 150 that is operatively connected with the second contact 108 through a linkage 152 (depicted schematically in FIG. 3). The bimetal strip 150 and the linkage 152 can be conventional.

Figure 3:
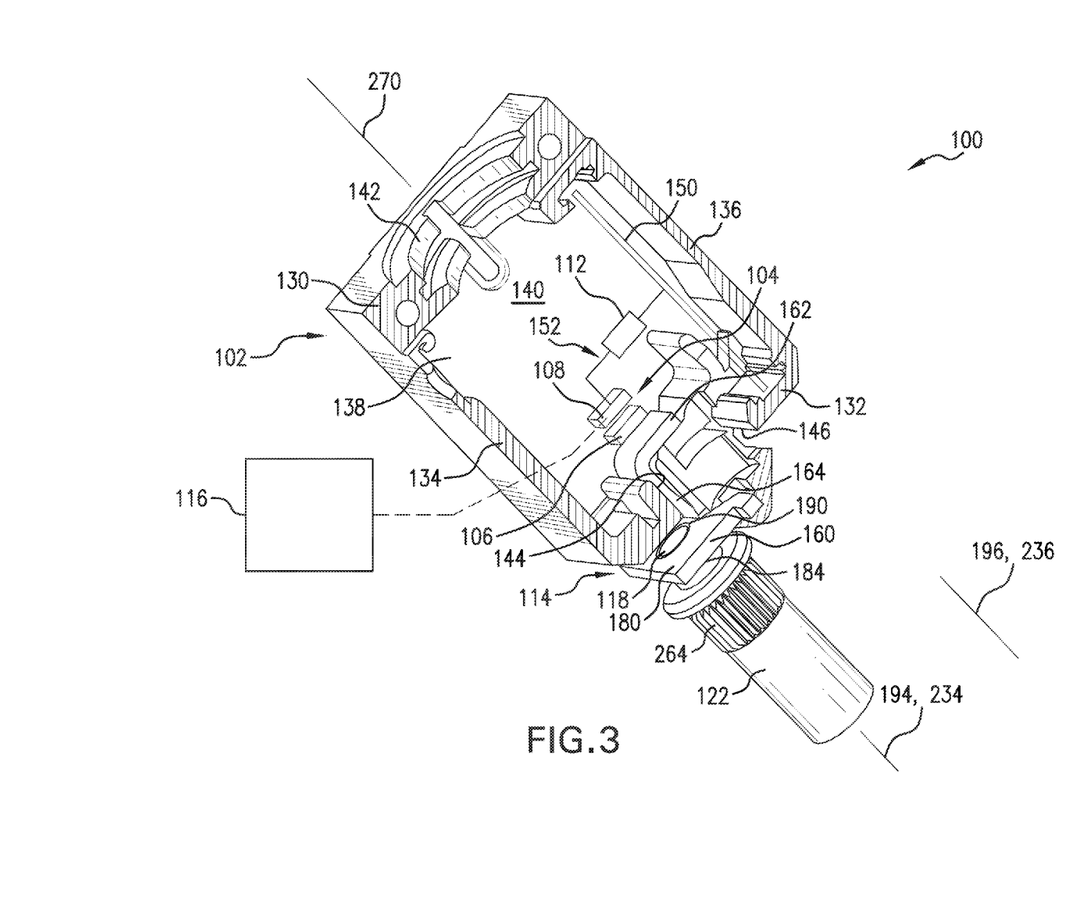
FIG. 3 is another perspective view of the circuit breaker shown in FIG. 2.
Figure 4:
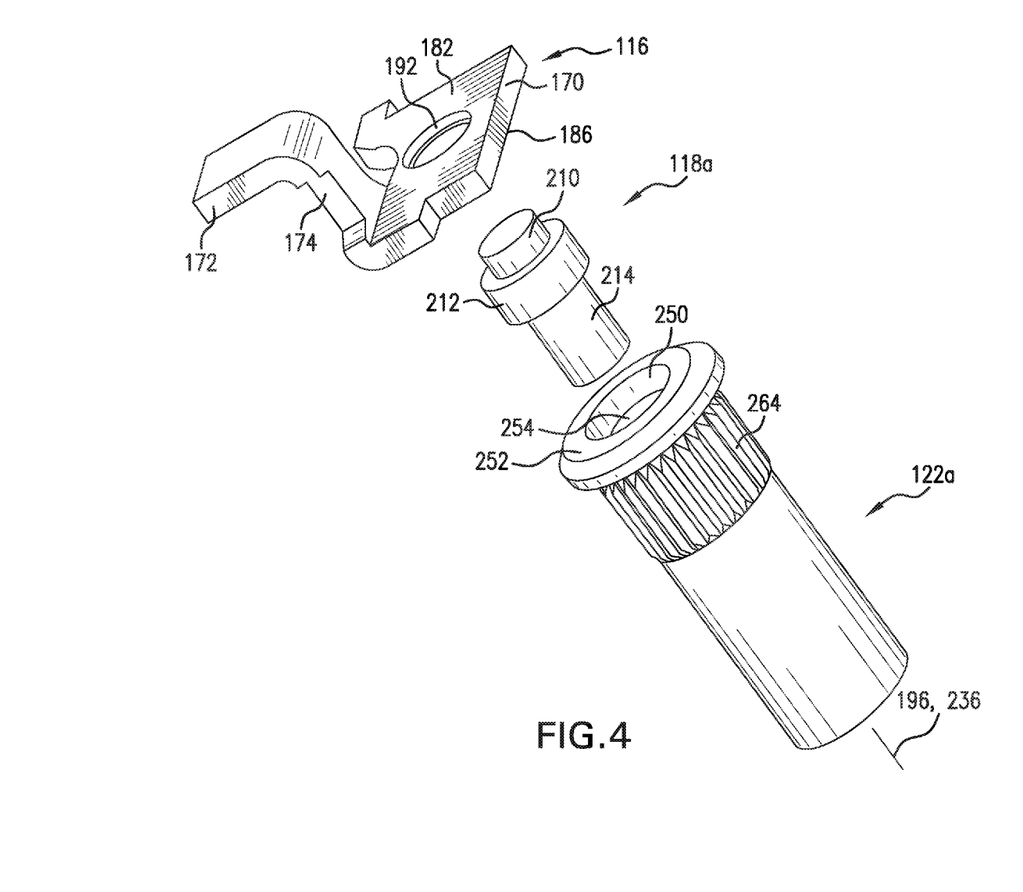
FIG. 4 is an exploded view showing a terminal, a press fit connector, and a socket for the circuit breaker shown in FIG. 2.

The first terminal 114 is made very similarly to the second terminal 116. Each of the terminals 114, 116 can be made from stamped metal so as to be conductive. With reference to FIG. 3, the first terminal 114 includes a base section, which will be referred to as a first base section 160, a contact engaging section, which will be referred to as a first contact engaging section 162, and a connecting section, which will be referred to as a first connecting section 164. The first connecting section 164 interconnects the first base section 160 with the first contact engaging section 162. With reference to FIG. 4, the second terminal 116 includes a base section, which will be referred to as a second base section 170, a contact engaging section, which will be referred to as a second contact engaging section 172, and a connecting section, which will be referred to as a second connecting section 174. The second connecting section 174 interconnects the second base section 170 with the second contact engaging section 172. Each base section 160, 170 is generally rectangular in plan view. Each base section 160, 170 includes a planar upper surface 180, 182, respectively, and a planar lower surface 184, 186, respectively. Each base section 160, 170 also includes a hole to receive a respective press fit connector 118, 118*a*. The first terminal 114 includes a first hole 190 extending through the first base section 160. The second terminal 116 includes a second hole 192 extending through the second base section 170. The first press fit connector 118 is received in the first hole 190. Similarly, the second press fit connector 118*a* is received in the second hole 192.

The first hole 190 defines a first hole axis 194. The first hole 190 is centered around the first hole axis 194. The second hole 192 defines a second hole axis 196 (also shown in FIG. 3 even though the second terminal 116 is not depicted in FIG. 3). The second hole 192 is centered around the second hole axis 196. The first hole axis 194 and the second hole axis 196 are parallel to pins on an associated bus structure that will be eventually received in the sockets 122, 122*a*. The holes 190, 192 are circular in the illustrated embodiment and each extends through their respective base section 160, 170. When installed, each of the planar upper surfaces 180, 182 is parallel with and contacts the lower wall 132 of the housing 102. With that orientation and the first hole axis 194 and the second hole axis 196 being aligned with the pins that are to be received in the sockets 122, 122*a*, the overall height of the assembly can be minimized or at least reduced.

The first contact engaging section 162 on the first terminal 114 contacts and/or electrically connects with the first contact 106. The second contact engaging section 172 on the second terminal 116 electrically connects with and/or contacts the second contact 108. The first connecting section 164 on the first terminal extends through the first terminal slot 144 provided in the lower wall 132 of the housing 102. Similarly, the second connecting section 174 on the second terminal 116 extends through the second terminal slot 146 provided in the lower wall 132 of the housing 102.

The first press fit connector 118 can be, and in the illustrated embodiment is, identical in configuration to the second press fit connector 118*a*. As such, elements of the second press fit connector 118*a* will be described with particularity with reference to FIGS. 4 and 5 and similar reference numbers may be used to refer to elements of the first press fit connector 118. The second press fit connector 118*a* in the illustrated embodiment is a shaft including a terminal connecting portion 210 having a first outer diameter that is greater than an inner diameter of the second hole 192 in the second base section 170 of the second terminal 116 in which the terminal connecting portion 210 is received (see FIG. 5). The second press fit connector 118*a* also includes a shoulder portion 212 having a second outer diameter that is greater than the first outer diameter. The second press fit connector 118*a* also includes a socket connecting portion 214 having a third outer diameter. In the illustrated embodiment, the first outer diameter is equal to the third outer diameter; however, this is not required. Also in the illustrated embodiment, the second outer diameter, which is the outer diameter for the shoulder portion 212, is larger than the third outer diameter. The shoulder portion 212 is positioned between the terminal connecting portion 210 and the socket connecting portion 214 in a direction along the second hole axis 196. The shoulder portion 212 contacts the second base section 170 of the second terminal 116 when the terminal connecting portion 210 is received in the second hole 192. With the terminal connecting portion 210 having a first outer diameter greater than an inner diameter of the second hole 192 in the second base section 170 of the second terminal 116 in which the terminal connecting portion 210 is received, an interference fit is provided between the second press fit connector 118*a* and the second terminal 116. An outer surface of the terminal connecting portion 210 can be rolled over or knurled to assist with retention of the terminal connecting portion 210 in the second hole 192. Since the first press fit connector 118 is identical to the second press fit connector 118*a* and connects to the first terminal 114 in a similar manner, an adequate connection between the press fit connectors 118, 118*a* and the respective terminals 114, 116 is provided without brazing, soldering, or welding.

As mentioned above, the first press fit connector 118 is attached to and electrically connected with the first base section 160 of the first terminal 114 via a first press fit, e.g., by insertion of the terminal connecting portion 210 having an outer diameter larger than the inner diameter of the first hole 190. Similarly, the second press fit connector 118*a* attaches to and is electrically connected with the second base section 170 of the second terminal 116 via a second press fit. If desired, each of the press fit connectors 118, 118*a* could include a socket instead of being formed as the shaft having the terminal connecting portion depicted in FIG. 4. In such an embodiment, a shaft would be provided on the respective base section 160, 170 of the respective terminals 114, 116 and the socket would have an inner diameter slightly smaller than the shaft provided on the respective base section 160, 170 so as to provide an interference or press fit.

As mentioned above, the circuit breaker 100 includes the first socket 122 attached to and electrically connected with the first press fit connector 118 and the second socket 122*a* attached to and electrically connected with the second press fit connector 118*a*. The first socket 122 can be, and in the illustrated embodiment is, identical in configuration to the second socket 122*a*. As such, elements of each socket 122, 122*a* may be referred to using the same reference number. With reference back to FIG. 2, the first socket 122 includes a pin receiving passage 230, which can be referred to as a first pin receiving passage, configured to receive a pin (such as one of the pins shown in FIG. 1) located on an associated bus structure. Similarly, the second socket 122*a* includes a second pin receiving passage (not visible in FIGS. 4 and 5) configured to receive another pin located on the associated bus structure. When the circuit breaker 100 is assembled, the first pin receiving passage 230 defines a first socket axis 234 that is parallel with the first hole axis 194. More particularly, the first socket axis 234 is coaxial with the first hole axis 194. Also, the second pin receiving passage in the second socket 122*a* defines a second socket axis 236 that is parallel (coaxial in the depicted embodiment) with the second hole axis 196. The first hole axis 194 is parallel with the second hole axis 196, and by providing such a configuration, the overall height of the circuit breaker 100 can be minimized.

Figure 5:
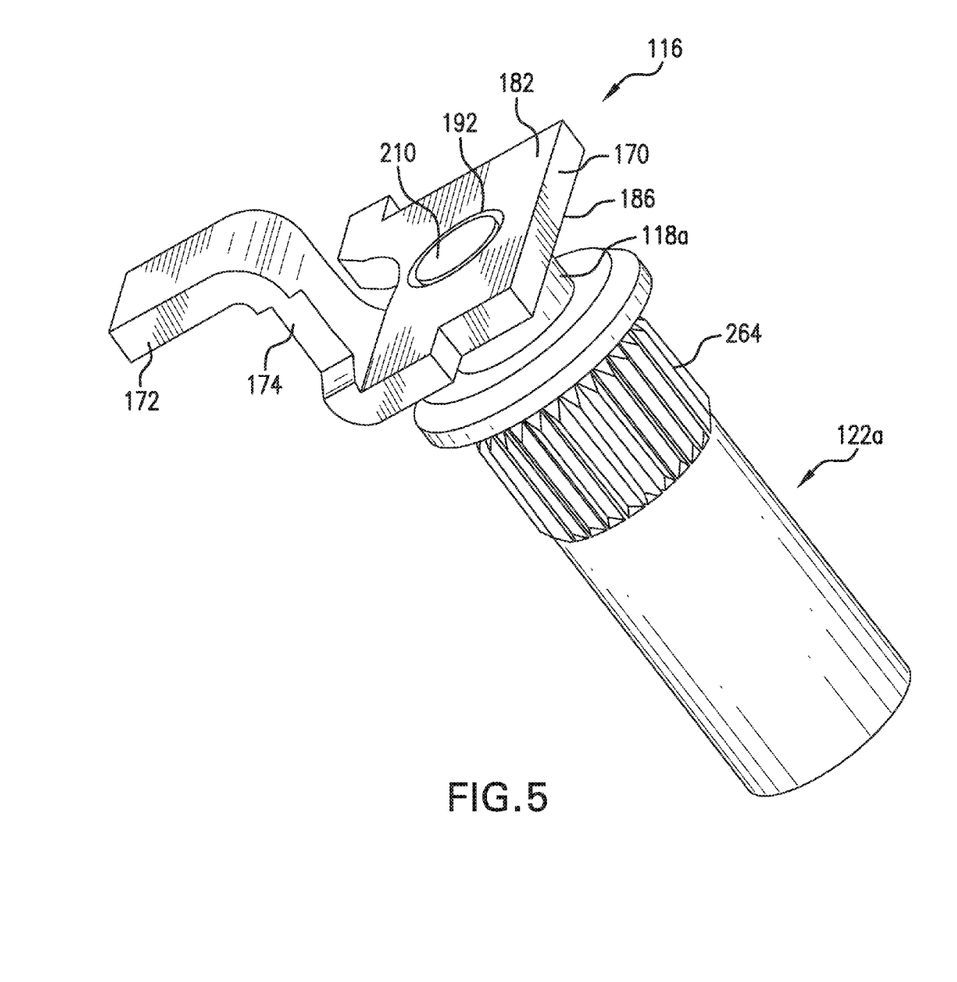
FIG. 5 is an assembled view of the terminal, press fit connector, and socket depicted in FIG. 4.

With reference to FIGS. 4 and 5, the second socket 122*a* includes a first (upper) opening 250 formed in an upper end wall 252. The first opening 250 leads to a press fit connector receiving passage 254 that is configured to receive the second press fit connector 118*a*. More particularly, the press fit connector receiving passage 254 is shaped similarly to the socket connecting portion 214 of the second press fit connector 118*a*. The press fit connector receiving passage 254 can have an inner diameter slightly smaller than the outer diameter of the socket connecting portion 214 to provide an interference fit, or press fit, between the second press fit connector 118*a* and the second socket 122*a*. An outer surface of the socket connecting portion 214 can be rolled over or knurled to assist in the retention of socket connecting portion 214 in the press fit connector receiving passage 254. In the illustrated embodiment, the press fit connector receiving passage 254 is centered with respect to the second socket axis 236. In an alternative arrangement, the press fit connector receiving passage 254 could be aligned parallel with the second socket axis 236.

The second socket 122*a* is press fit to the second press fit connector 118*a* by insertion of the second press fit connector 118*a* into the press fit connector receiving passage 254 provided in the second socket 122*a*. An alternative press fit, or interference fit, could be provided. For example, the second press fit connector 118*a* could include a passage and a post or shaft can be provided on the upper end wall 252 of the second socket 122*a* that is received in this passage. The passage could have an inner diameter slightly smaller than the outer diameter of the post or shaft on the upper end wall 252 to provide the press fit between the second socket and the alternative press fit connector, With reference back to the illustrated embodiment, FIG. 2 shows the first socket 122 including a second (lower) opening 260 provided in a second (lower) end wall 262. The second opening 260 in the first socket 122 leads to the pin receiving passage 230. The second socket 122*a* can also include an external knurled section 264 to facilitate attachment of the second socket 122*a* to the second press fit connector 118*a*.

The circuit breaker 100 also includes a manual actuator (not shown in FIGS. 2-5), which is similar to the manual actuator depicted in FIG. 1. The manual actuator translates along an actuator axis 270 to open and close the separable contacts similar to known manual actuators. The manual actuator is operatively connected with the linkage 152, or a similar linkage, operatively connected to the bimetal strip 150. The actuator axis 270 is parallel with each hole axis 194, 196.

The circuit breaker 100 can be assembled by placing the separable contacts 104 into the housing 102. The first terminal 114 is then connected with the first contact 106 of the separable contacts 104. The second terminal 116 is then connected with the second contact 108 of the separable contacts 104. The first press fit connector 118 can then be press fit with a portion of the first terminal 114 extending from the housing 102. The second press fit connector 118*a* can also be press fit with a portion of the second terminal 116 extending from the housing 102. The first socket 122 can be attached to the first press fit connector 118. The second socket 122*a* can be attached to the second press fit connector 118*a*.

Press fitting the first press fit connector 118 with a portion of the first terminal 114 can include pressing the first press fit connector 118 so as to translate the first press fit connector 118 along a first connection axis, which can be parallel or coaxial with the first hole axis 194. Similarly, press fitting the second press fit connector 118*a* with a portion of the second terminal 116 can involve pressing the second press fit connector 118*a* so as to translate the second press fit connector 118*a* along a second connection axis, which is parallel to the first connection axis and can be coaxial with the second hole axis 196.

Attaching the first socket 122 to the first press fit connector 118 can involve press fitting the first socket 122 to the first press fit connector 118 by translating the first socket 122 parallel with the first connection axis, mentioned above, with respect to the first press fit connector 118. Similarly, attaching the second socket 122*a* to the second press fit connector 118*a* can involve press fitting the second socket 122*a* to the second press fit connector 118*a* by translating the second socket 122*a* parallel with the second connection axis, which was mentioned above, with respect to the second press fit connector 118*a*. Press fitting the first socket 122 to the first press fit connector 118 can include inserting the socket connecting portion 214 of the first press fit connector 118 having an outer diameter into the press fit connector receiving passage 254 having an inner diameter that is smaller than the outer diameter of the socket connecting portion 214 of the first press fit connector 118. Press fitting the second socket 122*a* to the second press fit connector 118*a* can include inserting the socket connecting portion 214 of the second press fit connector 118*a* having an outer diameter into the press fit connector receiving passage 254 having an inner diameter that is smaller than the outer diameter of the socket connecting portion 214 of the second press fit connector 118*a*.

Press fitting the first press fit connector 118 with the first terminal can include inserting the first terminal connecting portion 210 of the first press fit connector 118 into the first hole 190 provided in the first terminal 114. Similarly, press fitting the second press fit connector 118*a* with the second terminal 116 includes inserting the second terminal connecting portion 210 of the second press fit connector 118*a* into the second hole 192 provided in the second terminal 116.

A circuit breaker with an interference fit socket and a method of its assembly have been described above in particularity. Modifications and alternations will occur to those upon reading and understanding the preceding detail description. The invention, however, is not limited to only the embodiment described above. Instead, the invention is broadly defined by the appended claims and the equivalents thereof.

The invention claimed is:

1. A circuit breaker comprising:
a housing;
separable contacts received in the housing including a first contact and a second contact, at least one of the first contact and the second contact being movable with respect to the other of the first contact and the second contact to open and close the separable contacts;
a trip mechanism operatively connected with at least one of the first and second contacts to selectively open the separable contacts;
a first terminal electrically connected with the first contact and including a first base section disposed outwardly from the housing;
a second terminal electrically connected with the second contact including a second base section disposed outwardly from the housing;
a first press fit connector attached to and electrically with connected with the first base section via a first press fit;
a second press fit connector attached to and electrically with connected with the second base section via a second press fit;
a first socket attached to and electrically connected with the first press fit connector, the first socket including a first pin receiving passage configured to receive a pin located on an associated bus structure; and
a second socket attached to and electrically connected with the second press fit connector, the second socket including a second pin receiving passage configured to receive another pin located on the associated bus structure.

2. The circuit breaker of claim 1, wherein the first terminal includes a first hole extending through the first base section, wherein the second terminal includes a second hole extending through the second base section, wherein the first press fit connector is received in the first hole, wherein the second press fit connector is received in the second hole.

3. The circuit breaker of claim 2, wherein the first hole defines a first hole axis and the first pin receiving passage defines a first socket axis that is parallel with the first hole axis.

4. The circuit breaker of claim 3, wherein the second hole defines a second hole axis and the second pin receiving passage defines a second socket axis that is parallel with the second hole axis.

5. The circuit breaker of claim 4, wherein the first hole axis is parallel to the second hole axis.

6. The circuit breaker of claim 4, wherein the first hole axis is coaxial with the first socket axis and the second hole axis is coaxial with the second socket axis.

7. The circuit breaker of claim 2, further comprising a manual actuator that translates along an actuator axis, wherein each first and second hole defines a respective hole axis, and each hole axis is parallel with the actuator axis.

8. The circuit breaker of claim 2, wherein each press fit connector is a shaft including a terminal connecting portion having a first outer diameter, which is greater than an inner diameter of the hole in the base section of the respective terminal in which the terminal connecting portion is received.

9. The circuit breaker of claim 8, wherein each press fit connector includes a shoulder portion having a second outer diameter, which is greater than the first outer diameter.

10. The circuit breaker of claim 9, wherein the shoulder portion contacts the base section of the respective terminal in which the terminal connecting portion is received.

11. The circuit breaker of claim 10, wherein each press fit connector includes a socket connecting portion having a third outer diameter, wherein the shoulder portion is positioned between the terminal connecting portion and the socket connecting portion.

12. The circuit breaker of claim 11, wherein each socket includes a press fit connector receiving passage, which has an inner diameter smaller than the third diameter, wherein each press fit connector is received in a respective press fit connector receiving passage.

13. The circuit breaker of claim 12, wherein each socket includes an upper end wall that contacts the shoulder of the respective press fit connector when the press fit connector is received in the respective press fit connector receiving passage.

14. A method of assembling a circuit breaker, the method comprising:
placing separable contacts in a housing;
connecting a first terminal with a first contact of the separable contacts;
connecting a second terminal with a second contact of the separable contacts;
press fitting a first press fit connector with a portion of the first terminal extending from the housing;
press fitting a second press fit connector with a portion of the second terminal extending from the housing;
attaching a first socket to the first press fit connector, the first socket including a first pin receiving passage configured to receive a pin located on an associated bus structure; and
attaching a second socket to the second press fit connector, the second socket including a second pin receiving passage configured to receive another pin located on the associated bus structure.

15. The method of claim 14, wherein press fitting the first press fit connector includes pressing the first press fit connector so as to translate the first press fit connector along a first connection axis,
wherein press fitting the second press fit connector includes pressing the second press fit connector so as to translate the second press fit connector along a second connection axis, which is parallel to the first connection axis.

16. The method of claim 15, wherein attaching the first socket to the first press fit connector includes press fitting the first socket to the first press fit connector by translating the first socket parallel with the first connection axis with respect to the first press fit connector;
wherein attaching the second socket to the second press fit connector includes press fitting the second socket to the second press fit connector by translating the second socket parallel with the second connection axis with respect to the second press fit connector.

17. The method of claim 14, wherein attaching the first socket to the first press fit connector includes press fitting the first socket to the first press fit connector;
wherein attaching the second socket to the second press fit connector includes press fitting the second socket to the second press fit connector.

18. The method of claim 17, wherein press fitting the first socket to the first press fit connector includes inserting a first socket connecting portion of the first press fit connector having an outer diameter into a first press fit connector receiving passage having an inner diameter that is smaller than the outer diameter of the first socket connecting portion;

wherein press fitting the second socket to the second press fit connector includes inserting a second socket connecting portion of the second press fit connector having an outer diameter into a second press fit connector receiving passage having an inner diameter that is smaller than the outer diameter of the second socket connecting portion.

19. The method of claim 14, wherein press fitting the first press fit connector includes inserting a first terminal connecting portion having a first outer diameter into a first hole having a first inner diameter, which is smaller than the first outer diameter, and is provided in the first terminal; and wherein press fitting the second press fit connector includes inserting a second terminal connecting portion having a second outer diameter into a second hole having a second inner diameter, which is smaller than the second outer diameter, and is provided in the second terminal.

* * * * *